(12) United States Patent
Han (10) Patent No.: US 9,774,635 B2
(45) Date of Patent: Sep. 26, 2017

(54) INFORMATION PROCESSING SYSTEM, DEVICE, AND INFORMATION PROCESSING METHOD

(71) Applicant: Xiaofeng Han, Kanagawa (JP)

(72) Inventor: Xiaofeng Han, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 77 days.

(21) Appl. No.: 14/478,007

(22) Filed: Sep. 5, 2014

(65) Prior Publication Data

US 2015/0082389 A1    Mar. 19, 2015

(30) Foreign Application Priority Data

Sep. 17, 2013 (JP) .................................. 2013-191355

(51) Int. Cl.
*G06F 21/00* (2013.01)
*H04L 29/06* (2006.01)

(52) U.S. Cl.
CPC ............ *H04L 63/205* (2013.01); *H04L 63/08* (2013.01)

(58) Field of Classification Search
CPC .......... H04L 63/00; H04L 63/08; H04L 63/10
(Continued)

(56) References Cited

U.S. PATENT DOCUMENTS

| 2007/0165265 A1 | 7/2007 | Ito et al. | |
| 2009/0009802 A1* | 1/2009 | Shaw | G06F 21/608 358/1.15 |

(Continued)

FOREIGN PATENT DOCUMENTS

| CN | 1763762 A | 4/2006 |
| CN | 102143297 A | 8/2011 |

(Continued)

OTHER PUBLICATIONS

Combined Office Action and Search Report issued on Mar. 3, 2017 in Chinese Patent Application No. 201410469019.0 with English translation.

*Primary Examiner* — Alexander Lagor
(74) *Attorney, Agent, or Firm* — Oblon, McClelland, Maier & Neustadt, L.L.P.

(57) ABSTRACT

A first obtaining unit obtains authentication information. A first sending unit sends the authentication information. A generating unit generates an execution request. A second sending unit sends the execution request. A device includes a first holding unit holding authentication information registered in advance; an authenticating unit performing an authentication operation by determining whether one or more sets of authentication information held by the first holding unit include authentication information matching with authentication information received by a first receiving unit; a second holding unit holding identification information of the authenticated user; and a control unit performing, when identification information included in the execution request received by a second receiving unit matches with identification information held by the second holding unit, control to perform operations based on the execution request, and, when the two sets of identification information do not match, control to request the information processing terminal for the authentication information.

9 Claims, 7 Drawing Sheets (58) Field of Classification Search
USPC .......................................................... 726/2–7
See application file for complete search history.

(56) References Cited

U.S. PATENT DOCUMENTS

| | | | | |
|---|---|---|---|---|
| 2009/0070864 | A1* | 3/2009 | Nishida | .................. G06F 21/31 |
| | | | | 726/7 |
| 2013/0010327 | A1* | 1/2013 | Miyata | .................. G06F 3/1204 |
| | | | | 358/1.15 |
| 2013/0229678 | A1* | 9/2013 | Ishikawa | .............. G06K 15/002 |
| | | | | 358/1.14 |

FOREIGN PATENT DOCUMENTS

| | | |
|---|---|---|
| CN | 102591595 A | 7/2012 |
| JP | 2006-203869 | 8/2006 |
| JP | 2008-003833 | 1/2008 |
| JP | 2009-238126 | 10/2009 |

\* cited by examiner

TABLE INFORMATION

| PRODUCT NAME | MACHINE NUMBER | LOCATION | IP | PORT NUMBER |
|---|---|---|---|---|
| XXX | 001 | C17-A | XXX.XXX.XXX.XXX | XXXXX |
| XXX | 002 | C17-B | XXX.XXX.XXX.XXX | XXXXX |
| XXX | 003 | C19-A | XXX.XXX.XXX.XXX | XXXXX |

DEVICE INFORMATION

INFORMATION PROCESSING SYSTEM, DEVICE, AND INFORMATION PROCESSING METHOD

CROSS-REFERENCE TO RELATED APPLICATIONS

The present application claims priority to and incorporates by reference the entire contents of Japanese Patent Application No. 2013-191355 filed in Japan on Sep. 17, 2013.

BACKGROUND OF THE INVENTION

1. Field of the Invention

The present invention relates to an information processing system, a device, and an information processing method.

2. Description of the Related Art

Conventionally, a technology is known in which a terminal issues a processing request to a device present on a network. However, conventionally, there was no mechanism by which, in an identical manner to a terminal, an operating unit that has been detached from a device main body becomes able to issue a processing request to device main bodies present on the network.

In view of the issue mentioned above, there is a need to provide an information processing system, a device, and an information processing method that provide a mechanism by which, in an identical manner to a terminal, an operating unit that has been detached from a device main body becomes able to issue a processing request to device main bodies present on the network.

SUMMARY OF THE INVENTION

It is an object of the present invention to at least partially solve the problems in the conventional technology.

According to the present invention, there is provided an information processing system comprising: a device; and an information processing terminal that functions as an operating unit of the device, wherein the information processing terminal includes a first obtaining unit that obtains authentication information which is used in an authentication operation for determining whether or not a user has rights to use the device; a first sending unit that sends the authentication information; a generating unit that, according to an instruction from the user, generates an execution request which includes identification information enabling identification of the user and which requests the device to perform an operation; and a second sending unit that sends the execution request, and the device includes a first receiving unit that receives the authentication information from the information processing terminal; a first holding unit that holds the authentication information which has been registered in advance; an authenticating unit that performs the authentication operation by determining whether or not one or more sets of the authentication information that are held by the first holding unit include the authentication information matching with the authentication information received by the first receiving unit; a second holding unit that holds the identification information of the user who has been authenticated; a second receiving unit that receives the execution request from the information processing terminal; and a control unit that, when the identification information included in the execution request received by the second receiving unit matches with the identification information held by the second holding unit, performs control to perform the operation based on the execution request, and, when the identification information included in the execution request received by the second receiving unit does not match with the identification information held by the second holding unit, performs control to request the information processing terminal for the authentication information.

The present invention also provides a device comprising: a first receiving unit that receives, from an information processing terminal that functions as an operating unit of the device, authentication information which is used in an authentication operation for determining whether or not a user has rights to use the device; a first holding unit that holds the authentication information which has been registered in advance; an authenticating unit that performs the authentication operation by determining whether or not one or more sets of the authentication information that are held by the first holding unit include the authentication information matching with the authentication information received by the first receiving unit; a second holding unit that holds identification information which enables identification of the user who has been authenticated; a second receiving unit that receives, from the information processing terminal, an execution request which includes the identification information and which requests the device to perform an operation; and a control unit that, when the identification information included in the execution request received by the second receiving unit matches with the identification information held by the second holding unit, performs control to perform the operation based on the execution request, and, when the identification information included in the execution request received by the second receiving unit does not match with the identification information held by the second holding unit, performs control to request the information processing terminal for the authentication information.

The present invention also provides an image processing method implemented in an information processing system which includes a device and an information processing terminal that functions as an operating unit of the device, the image processing method comprising: first-obtaining, by the information processing terminal, that includes obtaining authentication information which is used in an authentication operation for determining whether or not a user has rights to use the device; first-sending, by the information processing terminal, that includes sending the authentication information; generating, by the information processing terminal, that includes generating, according to an instruction from the user, an execution request which includes identification information enabling identification of the user and which requests the device to perform an operation; second-sending, by the information processing terminal, that includes sending the execution request; first-receiving, by the device, that includes receiving the authentication information from the information processing terminal; authenticating, by the device, that includes performing the authentication operation by determining whether or not one or more sets of the authentication information that are held in a first holding unit, which holds the authentication information which has been registered in advance, include the authentication information matching with the authentication information received at the first-receiving; second-receiving, by the device, that includes receiving the execution request from the information processing terminal; and controlling, by the device, that, when the identification information included in the execution request received at the second-receiving matches with the identification information held by a second holding unit which holds the identification information of the user who has been authenticated, includes performing control to perform the operation based on the execution request, and, when the identification information included in the execution request received at the second-receiving does not match with the identification information held by the second holding unit, includes performing control to request the information processing terminal for the authentication information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An exemplary embodiment of an information processing system, an information processing terminal, a device, an information processing method, a computer program product, and a recording medium according to the present invention is described below in detail with reference to the accompanying drawings.

Figure 1:
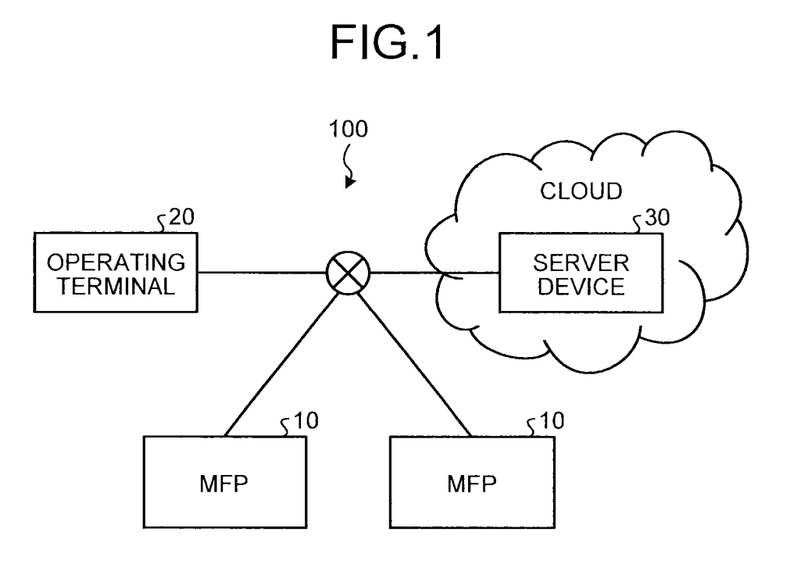
FIG. 1 is a diagram illustrating a configuration example of an information processing system.

As illustrated in FIG. 1, an information processing system 100 according to the present embodiment includes one or more MFPs 10, an operating terminal 20, and a server device 30. Each MFP 10 as well as the operating terminal 20 is connected to the server device 30 via a network such as the Internet (including a cloud service, an application service provider (ASP), and a Web service). In this example, it is possible to think that the operating terminal 20 corresponds to an "information processing terminal" mentioned in claims and each MFP 10 corresponds to a "device" mentioned in claims. However, that is not the only possible case. Moreover, with reference to FIG. 1, although the information processing system 100 includes two MFPs 10, that is not the only possible case. That is, the information processing system 100 can include an arbitrary number of MFPs 10. In essence, as long as the information processing system 100 includes at least one or more MFPs 10, it serves the purpose.

Each MFP 10 is a device (an information processing device) equipped with various functions such as copying, scanning, facsimile, and printing.

Figure 2:
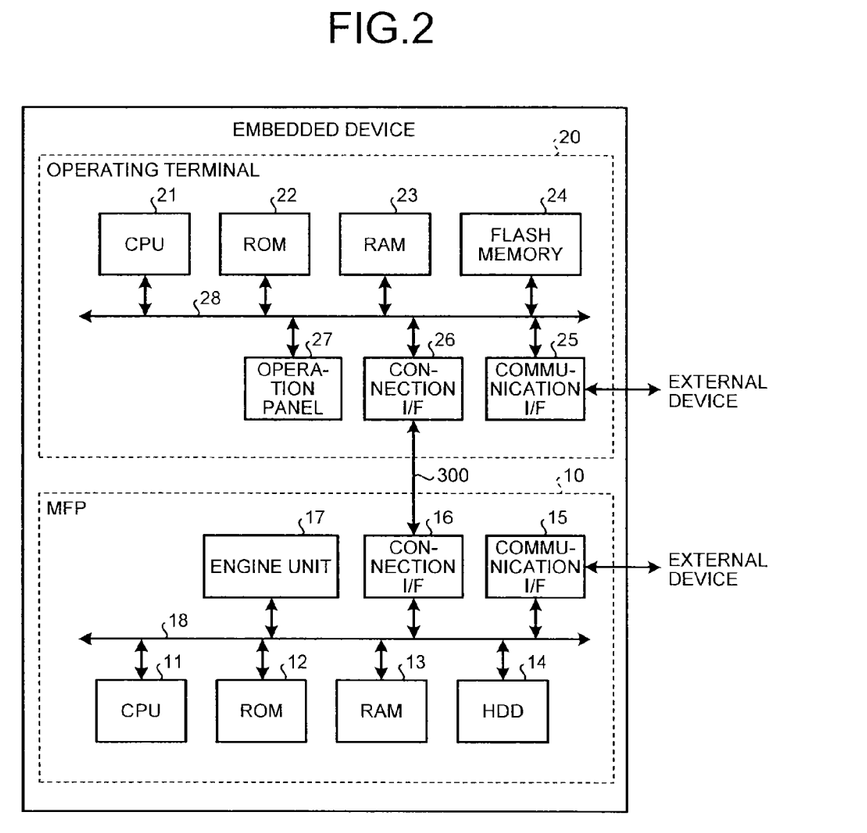
FIG. 2 is a diagram illustrating an exemplary hardware configuration of an embedded device.

The operating terminal 20 functions as the operating unit of the MFP 10, and is configured to be detachably attachable with respect to the MFP 10. In the following explanation, the state in which the operating terminal 20 is attached to the MFP 10 is sometimes called an "embedded device". FIG. 2 is a diagram illustrating an exemplary hardware configuration of the embedded device. The MFP 10 and the operating terminal 20 are connected to each other via a dedicated communication channel 300. In this example, as the communication channel 300, it is possible to use a channel based on the USB standard (USB stands for Universal Serial Bus). In the state in which the operating terminal 20 is attached to the MFP 10, the MFP 10 and the operating terminal 20 can communicate with each other via the communication channel 300.

The MFP 10 can perform operations according to an input received by the operating terminal 20. Moreover, the MFP 10 can also communicate with an external device such as a client personal computer (client PC) and can perform operations according to an instruction received from the external device.

Given below is the explanation of a hardware configuration of the MFP 10. As illustrated in FIG. 2, the MFP 10 includes a central processing unit (CPU) 11, a read only memory (ROM) 12, a random access memory (RAM) 13, a hard disk drive (HDD) 14, a communication interface (I/F) 15, a connection I/F 16, and an engine unit 17. All these constituent elements are connected to each other via a system bus 18.

The CPU 11 performs an overall control of the operations of the MFP 10. The CPU 11 uses the RAM 13 as a work area and executes computer programs, which are stored in the ROM 12 or the HDD 14, for controlling the overall operations of the MFP 10 and implementing various functions.

The communication I/F 15 is an interface that enables communication with an external device, such as a client PC or the server device 30, via a network such as the Internet. The connection I/F 16 is an interface for establishing connection with the operating terminal 20 via the communication channel 300.

The engine unit 17 represents hardware that performs general-purpose information processing and operations other than communication for the purpose of implementing the copying function, the scanning function, the facsimile function, and the printing function. For example, the engine unit 17 includes a scanner (an image reading unit) that scans and reads an original image, a plotter (an image forming unit) that performs printing on a paper sheet material, and a facsimile unit that performs facsimile communication. Moreover, the engine unit 17 can also include specific options such as a finisher for sorting of the printed sheets and an automatic document feeder (ADF) for automatic feeding of originals.

Given below is the explanation of a hardware configuration of the operating terminal 20. As illustrated in FIG. 2, the operating terminal 20 includes a CPU 21, a ROM 22, a RAM 23, a flash memory 24, a communication I/F 25, a connection I/F 26, and an operation panel 27. These constituent elements are connected to each other via a system bus 28.

The CPU 21 performs an overall control of the operations of the operating terminal 20. The CPU 21 uses the RAM 23 as a work area and executes computer programs, which are stored in the ROM 22 or the flash memory 24, for controlling the overall operations of the operating terminal 20 and implementing various functions (described later) such as displaying information (images) according to an input received from the user.

The communication I/F 25 is an interface that enables communication with an external device, such as the server device 30, via a network such as the Internet. The connection I/F 26 is an interface that enables establishing connection with the MFP 10 via the communication channel 300.

The operation panel 27 receives various inputs according to user operations, and displays a variety of information (for example, information indicating the operating status of the MFP 10 and information indicating the setting state). In this example, the operation panel 27 is configured with a liquid crystal display (LCD) equipped with a touch-sensitive panel function. However, that is not the only possible case. For example, the operation panel 27 can be configured with an organic EL display device equipped with a touch-sensitive panel function. Moreover, in addition to or in place of such a configuration, the operation panel can include an operating unit such as hardware keys or a display unit such as a lamp.

Figure 3:
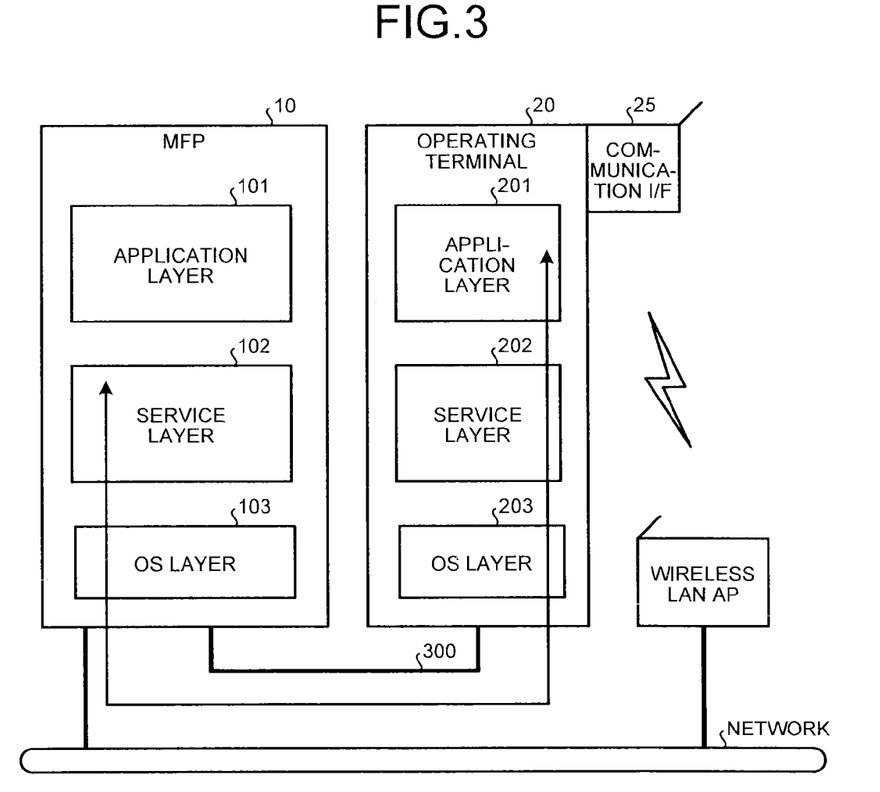
FIG. 3 is a diagram illustrating an exemplary software configuration of the embedded device.

FIG. 3 is a schematic diagram illustrating an exemplary software configuration of the embedded device. As illustrated in FIG. 3, the MFP 10 includes an application layer 101, a service layer 102, and an OS layer 103. Herein, in reality, the application layer 101, the service layer 102, and the OS layer 103 are various softwares stored in the ROM 12 or the HDD 14. The CPU 11 executes these softwares so that various functions are provided.

The software representing the application layer 101 is an application software (in the following explanation, sometimes simply referred to as an "application" or referred to as an "application program") that provides predetermined functions by operating the hardware resources. Examples of the types of application include a copying application for providing the copying function, a scanning application for providing the scanning function, a facsimile application for providing the facsimile function, a printing application for providing the printing function, and a Web service implementing application for providing various functions of the MFP 10 as Web services.

The software representing the service layer 102 is present in between the application layer 101 and the OS layer 103, and provides the applications with an interface that enables using the hardware resources of the MFP 10. More particularly, the software representing the service layer 102 provides a function of receiving operation requests with respect to the hardware resources and arbitrating the operation requests. Examples of the operation requests received by the service layer 102 include a request for reading with the use of the scanner or a request for printing with the use of the plotter.

Meanwhile, the interface of the service layer 102 is provided not only to the application layer 101 of the MFP 10 but also to an application layer 201 of the operating terminal 20. Thus, using the interface function of the service layer 102, the application layer 201 (application) of the operating terminal 20 can implement functions in which the hardware resources (such as the engine unit 17) of the MFP 10 are used.

The software representing the OS layer 103 is the basic software (an operating system) that provides the basic functions for controlling the hardware of the MFP 10. The software representing the service layer 102 converts the requests issued by various applications for using hardware resources into commands that are interpretable for the OS layer 103, and sends those commands to the OS layer 103. When the software representing the OS layer 103 executes a command, the hardware resources perform operations according to the corresponding request issued by an application.

In an identical manner, the operating terminal 20 includes the application layer 201, a service layer 202, and an OS layer 203. As far as the hierarchical structure is concerned, the application layer 201, the service layer 202, and the OS layer 203 of the operating terminal 20 are identical to the layers of the MFP 10. However, as compared to the layers of the MFP 10, the functions provided by the applications in the application layer 201 are different as well as the types of operation requests that can be received by the service layer 202 are different. As far as the applications in the application layer 201 are concerned, it is possible to have softwares for operating the hardware resources of the operating terminal 20 and providing predetermined functions. The applications in the application layer 201 mainly include the softwares that provide functions of a user interface (UI) for performing operations and display related to the functions of the MFP 10 (i.e., the copying function, the scanning function, the facsimile function, the printing function, and the Web service function).

Meanwhile, in the present embodiment, in order to maintain the independence of the functions, the software present in the OS layer 103 of the MFP 10 is different than the software present in the OS layer 203 of the operating terminal 20. That is, the MFP 10 and the operating terminal 20 operate on different operating systems in a mutually independent manner. For example, Linux (registered trademark) can be used as the software on the OS layer 103 of the MFP 10, while Android (registered trademark) can be used as the software on the OS layer 203 of the operating terminal 20.

Figure 4:
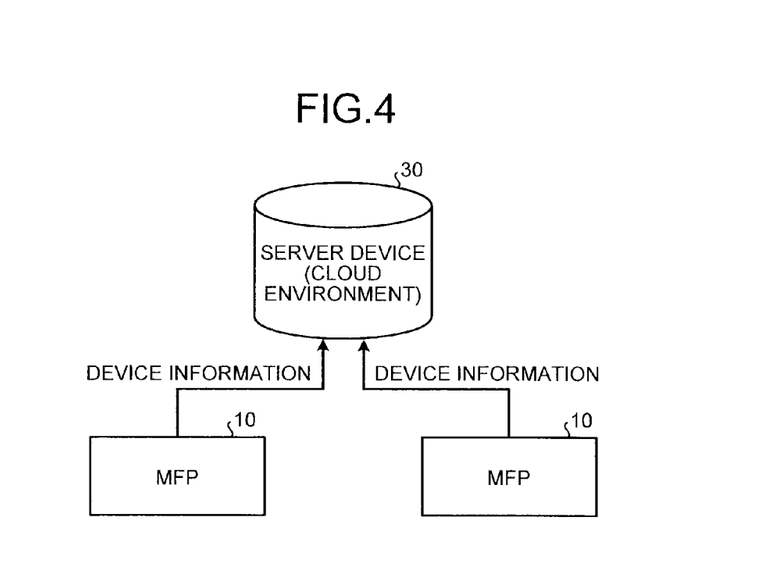
FIG. 4 is a schematic diagram illustrating a situation in which a server device collects device information from each MFP.

Given below is the explanation of the function of the server device 30. As illustrated in FIG. 4, the server device 30 has the function of collecting, from each MFP 10, device information that enables identification of that MFP 10. More particularly, when an automatic collection setting is turned ON; during the initial activation thereof, the server device 30 (for example, a cloud environment) can automatically collect the device information of the MFPs 10 present on the same network. Then, during activation thereof from the second time onward, the server device 30 can update the device information collected during the previous activation. When the automatic collection setting is turned OFF, the server device 30 can collect the device information in response to a manual operation performed by the user. Moreover, in response to a collection request issued from the second time onward, the server device 30 can update the device information collected during the previous activation. In this way, the server device 30 collects the device information from each MFP 10. Then, the server device 30 generates table information containing the device information of each MFP 10.

Figure 5:
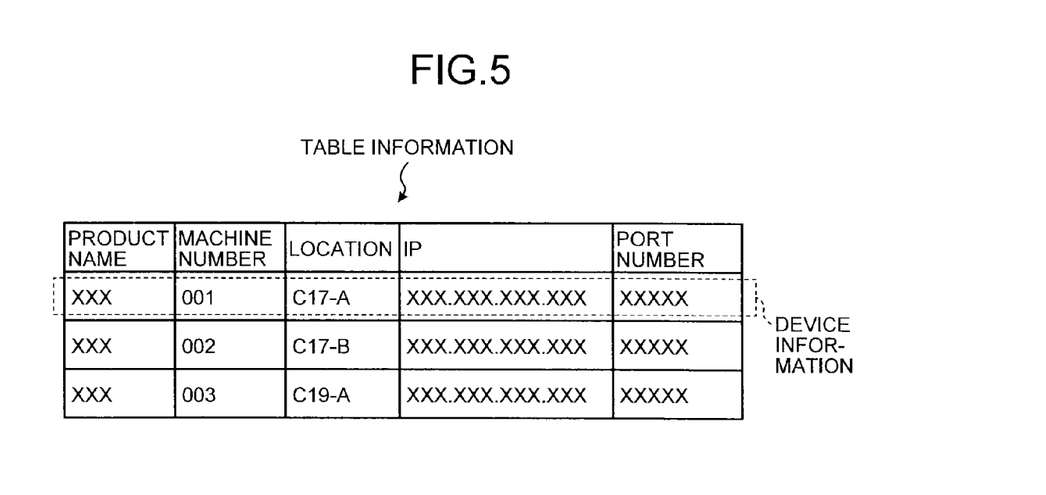
FIG. 5 is a diagram illustrating an example of table information.

FIG. 5 is a diagram illustrating an example of the table information generated by the server device 30. In the example illustrated in FIG. 5, the device information contains five types of items, namely, a product name, a machine number, a location, an IP, and a port number. However, the device information can contain an arbitrary number and types of items. The product name represents the proper name of each MFP 10. The machine number represents the number that enables unique identification of each MFP 10. The location represents the information (for example, location information) indicating the location of installation of each MFP 10. For example, regarding the MFP 10 that is installed in an area A on the 17-th floor of an office C, it is possible to think of an example in which "C17-A" is assigned as the location information. The IP and the port number represent the information used in communicating with the MFP 10.

Figure 6:
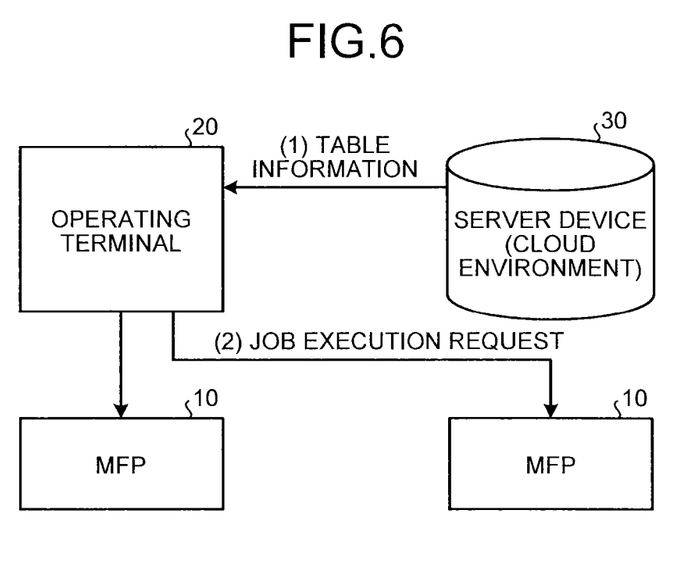
FIG. 6 is a schematic diagram illustrating a communication configuration of the information processing system.
Figure 7:
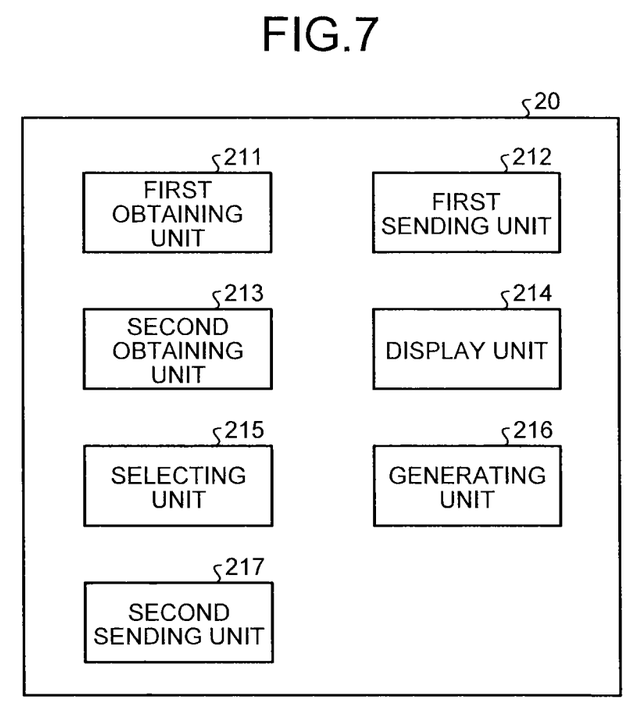
FIG. 7 is a diagram illustrating an exemplary functional configuration of an operating terminal.

As illustrated in FIG. 6, in the present embodiment, the operating terminal 20 that is detached from an MFP 10 refers to the table information obtained from the server device 30 and sends, to the local MFP 10 or to a remote MFP 10, a job execution request for requesting execution of a job. Given below is the concrete explanation of a functional configuration of the MFP 10 and the operating terminal 20. Firstly, explained with reference to FIG. 7 is a functional configuration of the operating terminal 20. FIG. 7 is a diagram illustrating an exemplary functional configuration of the operating terminal 20. For the purpose of illustration, in FIG. 7, the functions related to the present invention are mainly illustrated. However, the functions of the operating terminal 20 are not limited to those functions.

As illustrated in FIG. 7, the operating terminal 20 includes a first obtaining unit 211, a first sending unit 212, a second obtaining unit 213, a display unit 214, a selecting unit 215, a generating unit 216, and a second sending unit 217.

The first obtaining unit 211 obtains authentication information that is used in an authentication operation for determining whether or not the user has the rights to use the MFP 10. In this example, the user who wishes to use the MFP 10 performs a login operation from the operating terminal 20. For example, when the user performs an operation that triggers the login operation (for example, when the user presses a login button displayed on the operation panel 27); a screen is displayed on the operation panel 27 for prompting the user to input the user name and the password. Herein, the explanation is given for an example in which the combination of the user name and the password is used as the authentication information. However, that is not the only possible case; and, for example, it is possible to also include the domain name. Then, the first obtaining unit 211 receives (obtains) the user name and the password input by the user.

Meanwhile, alternatively, for example, the configuration can be such that the user performs the login operation using an IC card (IC stands for Integrated Circuit). In this case, the first obtaining unit 211 can read (obtain) the authentication information (in this example, the user name and the password) from the IC in which the authentication information is stored.

The first sending unit 212 sends the authentication information, which is obtained by the first obtaining unit 211, to the MFP 10.

The second obtaining unit 213 obtains the table information from the server device 30. The display unit 214 performs control to display the table information, which is obtained by the second obtaining unit 213, on the operation panel 27. For example, according to a predetermined rule, the display unit 214 can perform control to display the sets of device information side-by-side. As an example, based on the information (corresponding to "position information" mentioned in claims) that indicates the position (location) of each device and that is included in the table information obtained by the second obtaining unit 213, the display unit 214 can sort and display the sets of device information in order of distance. For example, from among the MFPs 10, closer the location of an MFP 10 to the operating terminal 20, higher can be the position of display of the corresponding device information.

The selecting unit 215 selects, according to an instruction from the user, at least one set of device information from the one or more sets of device information included in the table information displayed by the display unit 214. The generating unit 216 generates, according to an instruction from the user, an execution request (a job execution request) for performing operations (executing a desired job) with respect to the MFP 10 that is identified by the device information selected by the selecting unit 215. In this example, the job execution request includes the authentication information that enables identification of the user who requested the operations. This authentication information can be same as the authentication information mentioned above (in this example, same as the information represented as the combination of the user name and the password), or can be different than the authentication information mentioned above. For example, the identification information can be made of only the user name (or only the password) (i.e., can be partial authentication information), or can be information other than the user name and the password. For example, when the user performs the login operation using an IC card, then the identifier (the card ID) enabling identification of the IC card can be treated as the authentication information.

The second sending unit 217 sends the execution request generated by the generating unit 216. In the present embodiment, the second sending unit 217 sends the execution request, which is generated by the generating unit 216, to the MFP 10, which is identified by the device information selected by the selecting unit 215, without using the server device 30 (for example, a cloud environment).

Meanwhile, the first obtaining unit 211, the first sending unit 212, the second obtaining unit 213, the display unit 214, the selecting unit 215, the generating unit 216, and the second sending unit 217 are implemented when the CPU 21 uses the RAM 23 as a work area and executes computer programs stored in the ROM 22 or the flash memory 24. However, that is not the only possible case. Alternatively, for example, at least some of the functions of the operating terminal 20 can be implemented using dedicated hardware circuitry (such as a semiconductor integrated circuit).

Figure 8:
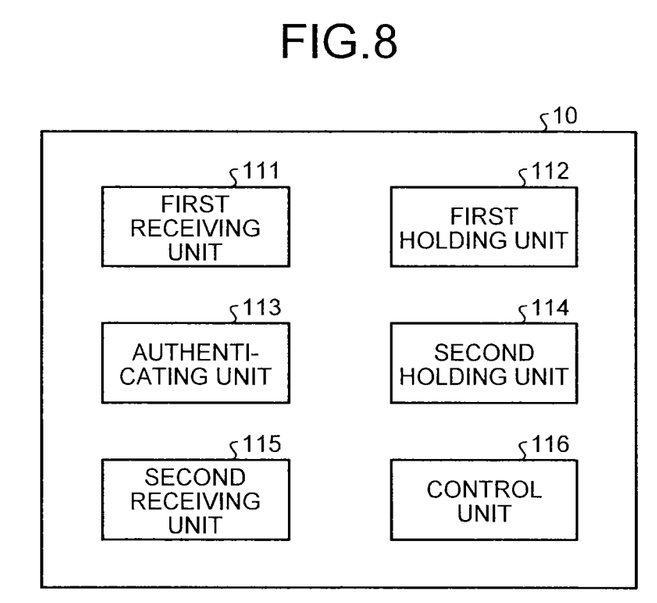
FIG. 8 is a diagram illustrating an exemplary functional configuration of each MFP.

Explained below with reference to FIG. 8 is a functional configuration of each MFP 10. FIG. 8 is a diagram illustrating an exemplary functional configuration of the MFP 10. For the purpose of illustration, in FIG. 8, the functions related to the present invention are mainly illustrated. However, the functions of the MFP 10 are not limited to those functions. As illustrated in FIG. 8, the MFP 10 includes a first receiving unit 111, a first holding unit 112, an authenticating unit 113, a second holding unit 114, a second receiving unit 115, and a control unit 116.

The first receiving unit 111 receives the authentication information from the operating terminal 20. The first holding unit 112 holds authentication information that has been registered in advance. For example, for each user who is allowed to use the MFP 10 (i.e., for each user having the rights to use the MFP 10), the system administrator can register in advance the user name and the password (as an example of the authentication information) in the main body of the MFP 10.

The authenticating unit 113 performs an authentication operation by determining whether or not one or more sets of authentication information held by the first holding unit 112 include the authentication information matching with the authentication information received by the first receiving unit 111. In the present embodiment, the authenticating unit 113 determines whether or not the combinations of user names and passwords as held by the first holding unit 112 include the combination matching with the combination of the user name and the password received by the first receiving unit 111. If a matching combination is determined to be present, then the authenticating unit 113 authenticates the user who is identified by the matching user name and the matching password (i.e., determines that the user has the rights to use the MFP 10).

The second holding unit 114 holds the authentication information that was used in authenticating the now-authenticated user. As described above, this authentication information can be same as the authentication information mentioned earlier, or can be some different information than the authentication information mentioned earlier.

The second receiving unit 115 receives an execution request from the operating terminal 20. If the authentication information included in the execution request received by the second receiving unit 115 matches with the authentication information held by the second holding unit 114, then the control unit 116 performs control to carry out operations based on the execution request held by the second receiving unit 115. However, if the authentication information included in the execution request received by the second receiving unit 115 does not match with the authentication information held by the second holding unit 114, then the control unit 116 performs control to request the operating terminal 20 for the authentication information (i.e., requests for the user login).

Meanwhile, the first receiving unit 111, the authenticating unit 113, the second receiving unit 115, and the control unit 116 are implemented when the CPU 11 uses the RAM 13 as a work area and executes computer programs stored in the ROM 12 or the HDD 14. However, that is not the only possible case. Alternatively, for example, at least some of the functions of the MFP 10 can be implemented using dedicated hardware circuitry (such as a semiconductor integrated circuit). Moreover, the first holding unit 112 and the second holding unit 114 can be implemented using, for example, at least one of the ROM 12, the RAM 13, and the HDD 14.

As described above, in each MFP 10 according to the present embodiment, the authentication information of the authenticated user (the user who has logged in) is held (cached). Then, if the cached authentication information matches with the authentication information included in the execution request received from the detached operating terminal 20; the operations are performed based on the execution request. However, if the two sets of authentication information do not match, then a login request is issued to the detached operating terminal 20. Thus, the user who has logged into any one MFP 10 can operate the detached operating terminal 20 and issue a processing request to that particular MFP 10.

Herein, although the invention is described with reference to the abovementioned embodiment for a complete and clear disclosure, the appended claims are not to be thus limited but are to be construed as embodying all modifications and alternative constructions that may occur to one skilled in the art that fairly fall within the basic teaching herein set forth. For example, it is possible to remove some constituent elements from all constituent elements explained in the embodiment.

Figure 9:
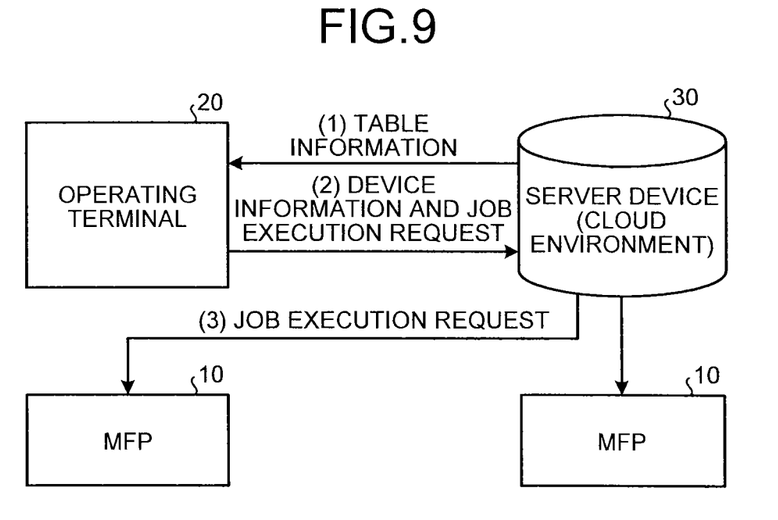
FIG. 9 is a schematic diagram illustrating modification example of the communication configuration of the information processing system.

For example, as illustrated in FIG. 9, the configuration can be such that the operating terminal 20 that is detached from an MFP 10 can send a job execution request to an MFP 10 via the server device 30 (for example, a cloud environment). More particularly, the operating terminal 20 that is detached from an MFP 10 obtains the table information from the server device 30. Then, according to an instruction from the user, the operating terminal 20 selects at least one set of device information from the one or more sets of device information included in the table information, and generates a job execution request to the MFP 10 that is identified by the selected device information. Subsequently, the operating terminal 20 (the second sending unit 217) sends the selected device information and the job execution request to the server device 30. Based on the device information received from the operating terminal 20, the server device 30 identifies the MFP 10 and sends the job execution request, which is received from the operating terminal 20, to the identified MFP 10.

Figure 10:
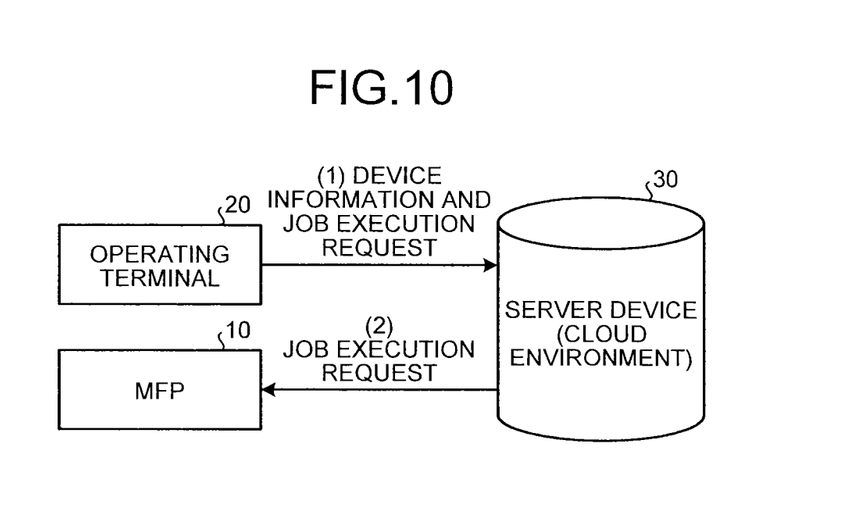
FIG. 10 is a schematic diagram illustrating modification example of the communication configuration of the information processing system.

Alternatively, for example, the step at which the operating terminal 20 obtains the table information from the server device 30 and selects the device information from the table information can be skipped. For example, as illustrated in FIG. 10, the operating terminal 20 can send the device information of the local MFP 10 (i.e., the MFP 10 connected to the operating terminal 20 without involving the Internet) and a job execution request to the server device 30. Then, the server device 30 can identify the MFP 10 based on the device information received from the operating terminal 20 and send the job execution request, which is received from the operating terminal 20, to the identified MFP 10.

Meanwhile, in the embodiment described above, the explanation is given for an example in which the "device" points to an MFP functioning as an image forming device. However, aside from an MFP, an image forming device can also be a laser printer (LP), a facsimile device, or a scanner. Moreover, other than an image forming device, the "device" can also be, for example, a projector, a teleconferencing system, or a digital camera.

(Computer Programs)

Various computer programs executed in the information processing system according to the embodiment and modification examples can be recorded as installable or executable files in a computer-readable recording medium such as a compact disk read only memory (CD-ROM), a flexible disk (FD), a compact disk readable (CD-R), a digital versatile disk (DVD), or a universal serial bus (USB). Alternatively, the computer programs can be distributed over a network such as the Internet. Still alternatively, the computer programs can be stored in advance in a ROM or the like.

According to an aspect of the present invention, a mechanism can be provided by which, in an identical manner to a PC or a mobile terminal, an operating unit that has been detached from a device main body becomes able to issue a processing request to device main bodies present on the network.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An information processing system comprising:
a device; and
an information processing terminal that functions as a detachable operating unit of the device, wherein
the information processing terminal includes
a first obtaining unit that obtains authentication information which is used in an authentication operation for determining whether or not a user has rights to use the device;
a first sending unit that sends the authentication information to the device so as to perform the authentication operation for causing the information processing terminal to function as an operating unit of the device;

a generating unit that, according to an instruction from the user, generates an execution request which includes identification information enabling identification of the user and which requests the device to perform an operation; and a second sending unit that sends the execution request, and the device includes a first receiving unit that receives the authentication information sent from the information processing terminal;

a first holding unit that holds the authentication information which has been registered in advance;

an authenticating unit that performs the authentication operation by determining whether or not one or more sets of the authentication information that are held by the first holding unit include the authentication information matching with the authentication information received by the first receiving unit;

a second holding unit that holds, as the user logged into the device, the identification information of the user who has been authenticated by the authentication operation;

a second receiving unit that receives the execution request from the information processing terminal; and a control unit that when the identification information included in the execution request received by the second receiving unit matches with the identification information held by the second holding unit, performs control to perform the operation based on the execution request, and, when the identification information included in the execution request received by the second receiving unit does not match with the identification information held by the second holding unit, performs control to request the information processing terminal for authentication information, wherein the information processing terminal further includes a second obtaining unit that, from a server device which is connected to one or more of the devices, obtains, for each of the devices, table information that contains device information enabling identification of the each of the devices, a display unit that displays the table information, wherein the display unit displays sets of the device information side-by-side according to a predetermined rule, and based on position information indicating positions of the devices, the display unit displays sets of the device information in order of distance, and a selecting unit that, according to an instruction from the user, selects at least one set of the device information from the displayed sets of the device information included in the table information; and the second sending unit performs control to send the execution request to the device that is identified by the device information selected by the selecting unit.

2. The information processing system according to claim 1, wherein
the identification information is used as the authentication information.

3. A device comprising:
a first receiving unit that receives, from an information processing terminal that functions as a detachable operating unit of the device, authentication information which is used in an authentication operation for determining whether or not a user has rights to use the device and for causing the information processing terminal to function as an operating unit of the device;

a first holding unit that holds the authentication information which has been registered in advance;

an authenticating unit that performs the authentication operation by determining whether or not one or more sets of the authentication information that are held by the first holding unit include the authentication information matching with the authentication information received by the first receiving unit;

a second holding unit that holds, as the user logged into the device, identification information which enables identification of the user who has been authenticated by the authentication operation;

a second receiving unit that receives, from the information processing terminal, an execution request which includes the identification information and which requests the device to perform an operation; and a control unit that when the identification information included in the execution request received by the second receiving unit matches with the identification information held by the second holding unit, performs control to perform the operation based on the execution request, and, when the identification information included in the execution request received by the second receiving unit does not match with the identification information held by the second holding unit, performs control to request the information processing terminal for authentication information, wherein the information processing terminal obtains, from a server device which is connected to one or more of the devices, for each of the devices, table information that contains device information enabling identification of the each of the devices, displays the table information, wherein the information processing terminal displays sets of the device information side-by-side according to a predetermined rule, and based on position information indicating positions of the devices, the information processing terminal displays sets of the device information in order of distance, and selects, according to an instruction from the user, at least one set of the device information from the displayed sets of the device information included in the table information; and the device receives the execution request when the device is identified by the selected device information selected at the information processing terminal.

4. The device according to claim 3, wherein
the identification information is used as the authentication information.

5. An image processing method implemented in an information processing system which includes a device and an information processing terminal that functions as a detachable operating unit of the device, the image processing method comprising:

first-obtaining, by the information processing terminal, that includes obtaining authentication information which is used in an authentication operation for determining whether or not a user has rights to use the device;

first-sending, by the information processing terminal, that includes sending the authentication information to the device so as to perform the authentication operation for causing the information processing terminal to function as an operating unit of the device;

generating, by the information processing terminal, that includes generating, according to an instruction from the user, an execution request which includes identification information enabling identification of the user and which requests the device to perform an operation;

second-sending, by the information processing terminal, that includes sending the execution request;

first-receiving, by the device, that includes receiving the authentication information sent from the information processing terminal;

authenticating, by the device, that includes performing the authentication operation by determining whether or not one or more sets of authentication information that are held in a memory of the device, which holds authentication information which has been registered in advance, include the authentication information matching with the authentication information received at the first-receiving;

holding, as the user logged into the device, the identification information of the user who has been authenticated by the authentication operation;

second-receiving, by the device, that includes receiving the execution request from the information processing terminal; and controlling, by the device, that,
when the identification information included in the execution request received at the second-receiving matches with the held identification information of the user who has been authenticated, includes performing control to perform the operation based on the execution request, and,
when the identification information included in the execution request received at the second-receiving does not match with the held identification information, includes performing control to request the information processing terminal for authentication information, the method further including second-obtaining, by the information processing terminal, that includes obtaining, from a server device which is connected to one or more of the devices, for each of the devices, table information that contains device information enabling identification of the each of the devices;

displaying, by the information processing terminal, that includes displaying the table information, wherein in the displaying, sets of the device information side-by-side are displayed according to a predetermined rule, and based on position information indicating positions of the devices, sets of the device information are displayed in order of distance; and selecting, by the information processing terminal, that includes selecting, according to an instruction from the user, at least one set of the device information from the displayed sets of the device information included in the table information, and in the second-sending, it is controlled to send the execution request to the device that is identified by the selected device information.

6. The image processing method according to claim 5, wherein the identification information is used as the authentication information.

7. An information processing system comprising:
a device; and
an information processing terminal that functions as a detachable operating unit of the device, wherein
the information processing terminal includes
processing circuitry configured to
obtain authentication information which is used in an authentication operation for determining whether or not a user has rights to use the device;
send the authentication information to the device so as to perform the authentication operation for causing the information processing terminal to function as an operating unit of the device;
generate, according to an instruction from the user, an execution request which includes identification information enabling identification of the user and which requests the device to perform an operation; and
send the execution request, and
the device includes
processing circuitry configured to
receive the authentication information sent from the information processing terminal;
hold authentication information which has been registered in advance;
perform the authentication operation by determining whether or not one or more sets of the held authentication information include the authentication information matching with the received authentication information;
hold, as the user logged into the device, the identification information of the user who has been authenticated by the authentication operation;
receive the execution request from the information processing terminal;
when the identification information included in the received execution request matches with the held identification information perform control to perform the operation based on the execution request, and,
when the identification information included in the received execution request does not match with the held identification information, perform control to request the information processing terminal for authentication information,
wherein the processing circuitry of the information processing terminal is further configured to
obtain, from a server device which is connected to one or more of the devices, for each of the devices, table information that contains device information enabling identification of the each of the devices,
control display, at a display unit, of the table information, including controlling display of sets of the device information side-by-side according to a predetermined rule, and based on position information indicating positions of the devices, and controlling display of sets of the device information in order of distance,
select, according to an instruction from the user, at least one set of the device information from the displayed sets of the device information included in the table information, and
perform control to send the execution request to the device that is identified by the selected device information.

8. A device comprising:
processing circuitry configured to receive, from an information processing terminal that functions as a detachable operating unit of the device, authentication information which is used in an authentication operation for determining whether or not a user has rights to use the device and for causing the information processing terminal to function as an operating unit of the device;

hold authentication information which has been registered in advance;

perform the authentication operation by determining whether or not one or more sets of the held authentication information include the authentication information matching with the received authentication information;

hold, as the user logged into the device, identification information which enables identification of the user who has been authenticated by the authentication operation;

receive, from the information processing terminal, an execution request which includes the identification information and which requests the device to perform an operation;

when the identification information included in the received execution request matches with the held identification information, perform control to perform the operation based on the execution request, and, when the identification information included in the received execution request does not match with the held identification information, perform control to request the information processing terminal for authentication information, wherein the information processing terminal obtains, from a server device which is connected to one or more of the devices, for each of the devices, table information that contains device information enabling identification of the each of the devices, controls display of the table information, which includes displaying sets of the device information side-by-side according to a predetermined rule, and based on position information indicating positions of the devices, the information processing terminal displays sets of the device information in order of distance, and selects, according to an instruction from the user, at least one set of the device information from the displayed sets of the device information included in the table information, and the device receives the execution request when the device is identified by the selected device information selected at the information processing terminal.

9. The information processing system according to claim 1, wherein the information processing terminal includes a first interface for directly communicating with the device and a second interface for performing communication over a network, and when the information processing terminal is not connected to a device via the first interface, the second obtaining unit obtains, from the server device which is connected to one or more of the devices via the second interface, for each of the devices, the table information that contains device information enabling identification of the each of the devices, and when the information processing terminal is connected to a device via the first interface, the second sending unit performs control to send the execution request to the device that is connected via the first interface.

* * * * *